US 8,144,564 B2

(12) United States Patent
Komma et al.

(10) Patent No.: US 8,144,564 B2
(45) Date of Patent: Mar. 27, 2012

(54) OPTICAL HEAD AND OPTICAL INFORMATION DEVICE

(75) Inventors: Yoshiaki Komma, Osaka (JP); Kanji Wakabayashi, Kyoto (JP); Kousei Sano, Osaka (JP); Toshiyasu Tanaka, Osaka (JP); Keiichi Matsuzaki, Osaka (JP); Hidenori Wada, Kyoto (JP)

(73) Assignee: Panasonic Corporation, Osaka (JP)

( * ) Notice: Subject to any disclaimer, the term of this patent is extended or adjusted under 35 U.S.C. 154(b) by 444 days.

(21) Appl. No.: 12/096,807

(22) PCT Filed: Dec. 12, 2006

(86) PCT No.: PCT/JP2006/324778
§ 371 (c)(1),
(2), (4) Date: Jun. 10, 2008

(87) PCT Pub. No.: WO2007/069612
PCT Pub. Date: Jun. 21, 2007

(65) Prior Publication Data
US 2009/0310465 A1 Dec. 17, 2009

(30) Foreign Application Priority Data

Dec. 14, 2005 (JP) .................................. 2005-359942
Jan. 31, 2006 (JP) .................................. 2006-022024

(51) Int. Cl.
*G11B 7/00* (2006.01)
*G11B 7/135* (2006.01)
*G02B 17/00* (2006.01)

(52) U.S. Cl. ......... 369/112.08; 369/112.09; 369/112.29; 369/112.27; 359/642; 359/726

(58) Field of Classification Search ............. 369/112.08, 369/112.09, 112.29, 112.27; 359/642, 726, 359/495, 583, 629, 639, 641
See application file for complete search history.

(56) References Cited

U.S. PATENT DOCUMENTS
5,923,636 A * 7/1999 Haruguchi et al. ...... 369/112.12
(Continued)

FOREIGN PATENT DOCUMENTS
JP 02-158927 6/1990
(Continued)

OTHER PUBLICATIONS
International Search Report for corresponding Application No. PCT/JP2006/324778 dated Jan. 16, 2007.
(Continued)

Primary Examiner — Joseph Feild
Assistant Examiner — Aneeta Yodichkas
(74) Attorney, Agent, or Firm — Renner, Otto, Boisselle & Sklar, LLP

(57) ABSTRACT

An optical head according to the present invention includes: a first light source that emits light with a first wavelength; a beam splitter that splits the light emitted from the first light source into a first light beam traveling in a first direction and a second light beam traveling in a second direction different from the first direction; a first collimator lens for changing degrees of divergence of the first light beam; a first mirror that changes the traveling directions of the first light beam, of which the degrees of divergence have been changed; a first objective lens for converging the first light beam, which has had its traveling directions changed, toward a storage layer of a first optical disk; a mover that holds the first objective lens; a first photodetector that receives the first light beam reflected from the storage layer of the first optical disk and converts it into an electrical signal; a condenser lens for condensing the second light beam; and a second photodetector that receives the second light beam condensed by the condenser lens and converts it into an electrical signal.

10 Claims, 7 Drawing Sheets

U.S. PATENT DOCUMENTS

| | | | |
|---|---|---|---|
| 6,081,496 A * | 6/2000 | Otsubo et al. | 369/112.26 |
| 2001/0012162 A1 | 8/2001 | Kato et al. | |
| 2001/0050894 A1 | 12/2001 | Takeuchi | |
| 2003/0086356 A1 | 5/2003 | Uchiyama et al. | |
| 2003/0227858 A1 | 12/2003 | Komma | |
| 2005/0007906 A1 | 1/2005 | Horinouchi et al. | |
| 2005/0249099 A1 | 11/2005 | Komma | |
| 2006/0007812 A1* | 1/2006 | Nishi et al. | 369/44.37 |
| 2006/0077784 A1* | 4/2006 | Kanaya et al. | 369/44.14 |
| 2006/0092816 A1* | 5/2006 | Kimura | 369/112.08 |
| 2007/0165500 A1* | 7/2007 | Sato | 369/44.32 |

FOREIGN PATENT DOCUMENTS

| | | |
|---|---|---|
| JP | 06-059172 | 3/1994 |
| JP | 10-011765 | 1/1998 |
| JP | 11-120587 | 4/1999 |
| JP | 2001-160229 | 6/2001 |
| JP | 2001-296472 | 10/2001 |
| JP | 2002-208173 | 7/2002 |
| JP | 2003-045068 | 2/2003 |
| JP | 2003-151159 | 5/2003 |
| JP | 2004-071134 | 3/2004 |
| JP | 2004-295983 | 10/2004 |
| JP | 2005-092979 | 4/2005 |
| JP | 2005-100513 | 4/2005 |
| JP | 2005-293686 | 10/2005 |
| JP | 2005-293707 | 10/2005 |
| JP | 2005-310331 | 11/2005 |

OTHER PUBLICATIONS

Form PCT/ISA/237 and a partial English translation.

* cited by examiner

OPTICAL HEAD AND OPTICAL INFORMATION DEVICE

TECHNICAL FIELD

The present invention relates to an optical information processor for reading and writing information optically and an optical head for use in such an optical information processor. The present invention also relates to an applied device including the optical information processor.

BACKGROUND ART

Optical disks have been used extensively as information storage media that can store a huge amount of information. And as technologies have been marching on, optical disks with even bigger storage capacities have been developed one after another.

The optical disk that became popular earlier than any other type of optical disk was a compact disc (CD), which was then followed by digital versatile discs (DVDs). A DVD can store information at a storage density that is approximately six times as high as a CD's. Thus, a large amount of information can be stored on a single DVD. That is why DVDs have been used to store video that has a particularly huge amount of information. Meanwhile, next-generation optical disks that can store information at even higher densities, including Blu-ray Discs (BDs) and HD-DVDs, have been developed recently and are lately used by more and more general consumers to store high-definition video.

To increase the capacity of an optical disk, the storage density thereof needs to be increased, which can be done by decreasing the spot size of a light beam for use to perform read and write operations. And to decrease the spot size of a light beam, the wavelength of a laser beam as a light source needs to be shortened and the numerical aperture (NA) of an objective lens that forms the light beam spot needs to be increased. For example, a light source with a wavelength of 660 nm and an objective lens with a numerical aperture (NA) of 0.6 are used in combination for DVDs. Furthermore, next-generation optical disks, on which information can be stored five times as densely as on ongoing DVDs, are realized by using a blue laser beam with a wavelength of 405 nm and an objective lens with an NA of 0.85.

As the number of types of optical disks commonly used increases, the compatibility of an optical disk drive becomes more and more important. To come in handy for its users, an optical disk drive is preferably compatible with multiple types of optical disks. Specifically, an optical disk drive compatible with next-generation optical disks is preferably able to read and write from/to CDs and DVDs. In that case, however, it is difficult to make the working distance of an objective lens as long as the one defined for DVDs and CDs while increasing the numerical aperture of the objective lens to 0.85. For that reason, an optical information processor that can perform a read/write operation on next-generation optical disks preferably includes an objective lens for next-generation optical disks and at least one more objective lens to read and write from/to CDs and DVDs.

An objective lens is driven in a focusing direction and in a tracking direction by an objective lens actuator that includes a magnetic circuit. That is to say, the objective lens is controlled to maintain a predetermined gap with respect to an optical disk in the focusing direction and to follow the center of the tracks in the tracking direction.

For that reason, in an optical information processor designed to process multiple types of optical disks with mutually different storage densities, a plurality of objective lenses needs to be provided for a mover so as to be movable both in the focusing direction and in the tracking direction. Patent Document No. 1 discloses an example of such an optical information processor. As shown in FIG. 12, in the optical information processor of Patent Document No. 1, the light beam 61 emitted from a first light source (not shown) is transformed by a collimator lens 62 into a substantially parallel light beam, which is then refracted by a planar vertical reflecting mirror 63 such that its optical axis intersects with a high storage density optical disk 65 at right angles. A first objective lens 65 converges the light beam 61 onto a storage layer of the optical disk 65.

Meanwhile, the light beam 66 emitted from a second light source (not shown) is transformed by a collimator lens 67 into a substantially parallel light beam, which is then refracted by a planar vertical reflecting mirror 68 such that its optical axis intersects with a low storage density optical disk 70 at right angles. A second objective lens 69 converges the light beam 66 onto a storage layer of the optical disk 70.

An objective lens actuator 71 can move the first objective lens 64, which is fixed on a mover (not shown), both in the focusing direction F, which intersects with the storage layer of the high storage density optical disk 65 at right angles, and in the tracking direction T on the optical disk 65. Likewise, an objective lens actuator 72 can move the second objective lens 69, which is fixed on a mover (not shown), both in the focusing direction F, which intersects with the storage layer of the low storage density optical disk 70 at right angles, and in the tracking direction T on the optical disk 70. In this manner, in the optical information processor disclosed in Patent Document No. 1, the two objective lenses are driven by two separate objective lens actuators.

On the other hand, Patent Document No. 2 discloses an optical information processor in which two objective lenses are held by the same mover and are driven in the focusing and tracking directions by a single objective lens actuator.

Patent Document No. 3 discloses another example of such an optical information processor in which two objective lenses are held by the same mover and are driven in the focusing and tracking directions by a single objective lens actuator. Such an optical information processor includes three light sources to process three types of optical disks with mutually different storage densities as shown in FIG. 13. Specifically, the optical information processor includes a semiconductor laser 73, a DVD module 85 including a semiconductor laser, and a CD module 83 also including a semiconductor laser.

The semiconductor laser 73 emits a laser beam with a wavelength of 408 nm and is used to read and write information from/on a high density optical disk. The light beam emitted from the semiconductor laser 73 is transmitted through a collimator lens 74 and then incident on a half mirror 75. Part of the light that has been incident on the half mirror 75 then enters a monitor photodiode 78, but most of the light then enters a vertical reflecting mirror 88, which reflects the incoming light toward an objective lens 80. The light reflected from the optical disk initially follows the same path in the opposite direction. But after having been incident on the half mirror 75, the light is transmitted through a cylindrical lens 77 and then received at a photodetector 76.

The DVD module 85 includes a red semiconductor laser that emits a laser beam with a wavelength of 658 nm and a photodetector, and is used to read and write information from/on DVDs. The light beam emitted from the semiconductor laser of the DVD module 85 is transmitted through a DVD collimator lens 86 and a polarization beam splitter 87 and then incident on the vertical reflecting mirror 88, which reflects the incoming light toward an objective lens 81. The light reflected from the optical disk initially follows the same path in the opposite direction and then enters the photodetector of the DVD module 85.

The CD module 83 includes a red semiconductor laser that emits a laser beam with a wavelength of 785 nm and a photodetector, and is used to read and write information from/on CDs. The light beam emitted from the semiconductor laser of the CD module 83 is transmitted through a CD collimator lens 84 and the polarization beam splitter 87 and then incident on the vertical reflecting mirror 88, which reflects the incoming light toward the objective lens 81. The light reflected from the optical disk initially follows the same path in the opposite direction and then enters the photodetector of the CD module 83.

The objective lenses 80 and 81 are held by a holder 79 that operates as a mover. The holder 79 is supported by wires 82 so as to be movable in the focusing direction and in the tracking direction.

Patent Document No. 1: Japanese Patent Application Laid-Open Publication No. 2002-208173
Patent Document No. 2: Japanese Patent Application Laid-Open Publication No. 11-120587
Patent Document No. 3: Japanese Patent Application Laid-Open Publication No. 2005-293686

DISCLOSURE OF INVENTION

Problems to be Solved by the Invention

However, the optical information processor of Patent Document No. 1 includes two objective lens actuators. Therefore, the gap between the objective lenses 64 and 69 cannot be decreased sufficiently, thus making it difficult to reduce the size of the optical head of the optical information processor. Nevertheless, if the objective lens actuators 71 and 72 had their sizes reduced to avoid this problem, there would not be enough space left to provide coils and magnets to generate driving force for the mover. As a result, the driving force would be insufficient.

On the other hand, in the optical information processor disclosed in Patent Document No. 2, the optical axis of a light beam that is supposed to be incident on one of the two objective lenses runs straight from its light source toward that objective lens. That is why the optical head has a very large thickness as measured perpendicularly to the disk surface.

Patent Document No. 3 discloses an optical head that can have its thickness reduced by vertically reflecting light beams, emitted from multiple light sources, using a prism. However, the horizontal arrangement of those members is not taken into full consideration. For that reason, when the optical head is accessing the innermost area of an optical disk, there could be some interference or collision between the spindle motor and the optical head.

Furthermore, in performing a read/write operation on an optical disk with a high storage density such as a BD or an HD-DVD, a blue semiconductor laser is used. The blue semiconductor laser requires a higher drive voltage and dissipates more power than light sources for reading and writing from/to DVDs and CDs. The present inventors discovered and confirmed via experiments that if the size of the optical head was reduced, the heat generated by the blue semiconductor laser decreased the SNR of a photodetector and other components in the optical head, thus making it difficult to get the read/write operation done with stability.

On top of that, in performing a write operation on such an optical disk with a high storage density, recording marks and pits should be formed accurately on the information storage layer of the optical disk. For that purpose, the intensity of the light emitted from the light source needs to be monitored. In particular, the higher the storage density, the smaller the recording marks and pits get. In that case, the intensity of the light emitted from the light source should be monitored at an even higher SNR and with even higher frequencies. However, Patent Documents Nos. 1 to 3 fail to disclose any appropriate method for monitoring the intensity of light to perform a read/write operation on an optical disk with a high storage density such as BDs and HD-DVDs.

Furthermore, in performing a read/write operation on a high-density optical disk with the light converged by an objective lens having a high NA, the wavefront of the light will fluctuate significantly due to a variation in base material thickness, i.e., the distance from the surface of the optical disk on which the incoming light is incident to the information storage layer of the optical disk. This fluctuation is called a "spherical aberration", which is roughly proportional to the fourth power of an NA. For that reason, if an objective lens with a high NA is used, then some means for correcting the spherical aberration is required. However, Patent Documents Nos. 1 to 3 disclose no specific means for correcting the spherical aberration efficiently using a minimum number of members in a conventional optical system.

In order to overcome at least one of these problems of the prior art, the present invention has an object of providing an optical head that has at least one light source for high-density optical disks, has a small overall size, but can perform read/write operations on multiple types of optical disks with good stability.

Means for Solving the Problems

An optical head according to the present invention includes: a first light source that emits light with a first wavelength; a beam splitter that splits the light emitted from the first light source into a first light beam traveling in a first direction and a second light beam traveling in a second direction, which is different from the first direction; a first collimator lens for changing degrees of divergence of the first light beam; a first mirror that changes the traveling directions of the first light beam, of which the degrees of divergence have been changed; a first objective lens for converging the first light beam, which has had its traveling directions changed, toward a storage layer of a first optical disk; a mover that holds the first objective lens; a first photodetector that receives the first light beam that has been reflected from the storage layer of the first optical disk and converts the first light beam into an electrical signal; a condenser lens for condensing the second light beam; and a second photodetector that receives the second light beam that has been condensed by the condenser lens and converts the second light beam into an electrical signal.

In one preferred embodiment, the optical head further includes a second mirror that changes the traveling directions of the second light beam that has come from the beam splitter. The second mirror is arranged with respect to the beam splitter so as to change the traveling directions of the light beam from the second direction into a direction perpendicular to the second direction.

In this particular preferred embodiment, the optical axis of the second light beam that has had its traveling directions changed by the second mirror and that of the first light beam that has had its traveling directions changed by the first mirror are parallel to each other.

In a specific preferred embodiment, the second photodetector has an elongated shape with a longitudinal direction and is arranged such that the longitudinal direction is substantially parallel to the optical axis of the first collimator lens.

In a more specific preferred embodiment, the second photodetector includes an electrical connector on one side that runs in the longitudinal direction.

In this particular preferred embodiment, the optical head further includes a drive motor that moves the first collimator lens parallel to the optical axis of the first collimator lens. The drive motor is arranged closer to the outer edge of the first optical disk with respect to the optical axis of the first collimator lens.

In still another preferred embodiment, the optical head further includes a lens that includes a concave lens and a diffraction lens, located on the curved surface of the concave lens, and that corrects a chromatic aberration of the first objective lens.

In this particular preferred embodiment, the first light source and the first photodetector are arranged on mutually opposite sides with respect to the optical axis of the first collimator lens.

In a specific preferred embodiment, the optical head further includes: a second light source that emits light with a second wavelength, which is longer than the first wavelength; a second mirror that changes the traveling directions of the light emitted from the second light source; and a second objective lens for converging the light that has been emitted from the second light source and then has had its traveling directions changed by the second mirror toward a storage layer of a second optical disk. The second objective lens is held on the mover.

In still another preferred embodiment, the first and second light sources are arranged closer to the outer edge of the first optical disk with respect to the optical axis of the first collimator lens.

In yet another preferred embodiment, the optical head further includes a driver for driving the first and second light sources. The driver is arranged close to the first and second light sources.

In this particular preferred embodiment, the second wavelength is used to perform a read/write operation on a DVD and the first wavelength is used to perform a read/write operation on an optical disk that has a higher storage density than a DVD.

In a specific preferred embodiment, the first and second objective lenses are arranged along a tangential line drawn with respect to the first and second optical disks.

In a more specific preferred embodiment, the first objective lens is located on a line that passes the center of the first optical disk and that is parallel to a direction in which the optical head moves in performing a seek operation.

In this particular preferred embodiment, the second objective lens has a flange with a width of 0.16 mm to 1 mm.

In a specific preferred embodiment, the surface of the flange of the objective lens is mirror-finished.

An optical information processor according to the present invention includes: an optical head according to any of the preferred embodiments of the present invention described above; a spindle motor for rotating and driving the first optical disk; and an electrical circuit for controlling the optical head based on at least a signal supplied from the first photodetector of the optical head.

A computer according to the present invention includes the optical information processor of the present invention.

An optical disk player according to the present invention includes the optical information processor of the present invention.

An optical disk recorder according to the present invention includes the optical information processor of the present invention.

An optical disk server according to the present invention includes the optical information processor of the present invention.

Effects of the Invention

According to the present invention, by providing a condenser lens, the light that is going to enter the second photodetector can be condensed such that a lot of light can be converged on a small photosensitive area of the photodetector. As a result, the intensity of the light emitted from the first light source can be measured in a high frequency range and with a high SNR. Consequently, an optical head that can keep the emission intensity of the first light source constant and that can generate a quality read signal with little jitter is realized.

Also, according to the present invention, a read/write operation can be done on an optical disk that is supposed to use an objective lens with a high NA to the innermost area thereof. In addition, the read/write operation can be performed with good stability with an increase in the temperature of the light source minimized. On top of that, information can be written quickly on any of multiple types of optical disks with mutually different storage densities.

Besides, according to the present invention, optical members can be housed in a limited space. Thus, data can be read and written by moving the optical head to the innermost part of the storage area of the optical disk.

Consequently, the present invention realizes an optical head in which multiple objective lenses, required to enable an optical information processor to perform read/write operations on multiple types of optical disks with mutually different storage densities, are provided for its mover.

Figure 1:
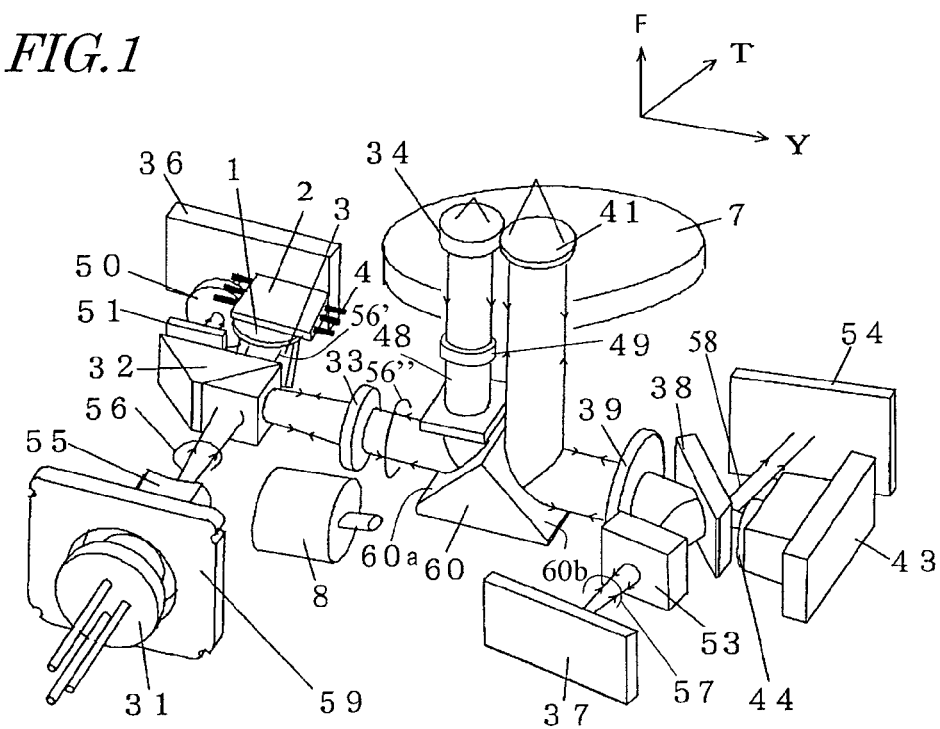
FIG. 1 is a perspective view illustrating mainly the arrangement of an optical system in a preferred embodiment of an optical head according to the present invention.

DESCRIPTION OF REFERENCE NUMERALS 31 first light source
56, 57, 58 light beam
33 first collimator lens
39 second collimator lens
60 prism
60a, 60b slope
35 first optical disk
46 third optical disk
34 first objective lens
41 second objective lens
59 polarization beam splitter
36 first photodetector
37a second light source
40 polarization hologram
37, 43 integrated unit
43a third light source
43b hologram
45 objective lens actuator
320 second optical disk

BEST MODE FOR CARRYING OUT THE INVENTION

Embodiment 1

Hereinafter, a Preferred Embodiment of an Optical head according to the present invention will be described.

Figure 2:
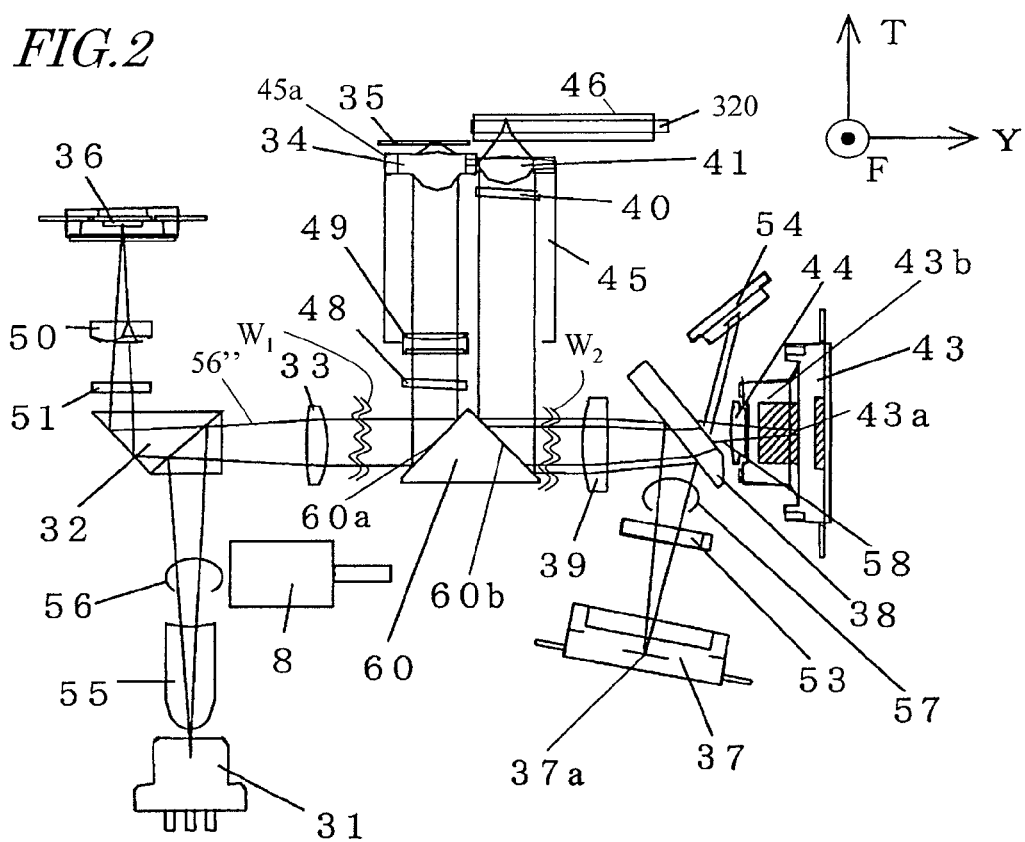
FIG. 2 schematically illustrates some of the members shown in FIG. 1 as a combination of a plan view and a side view.
Figure 3:
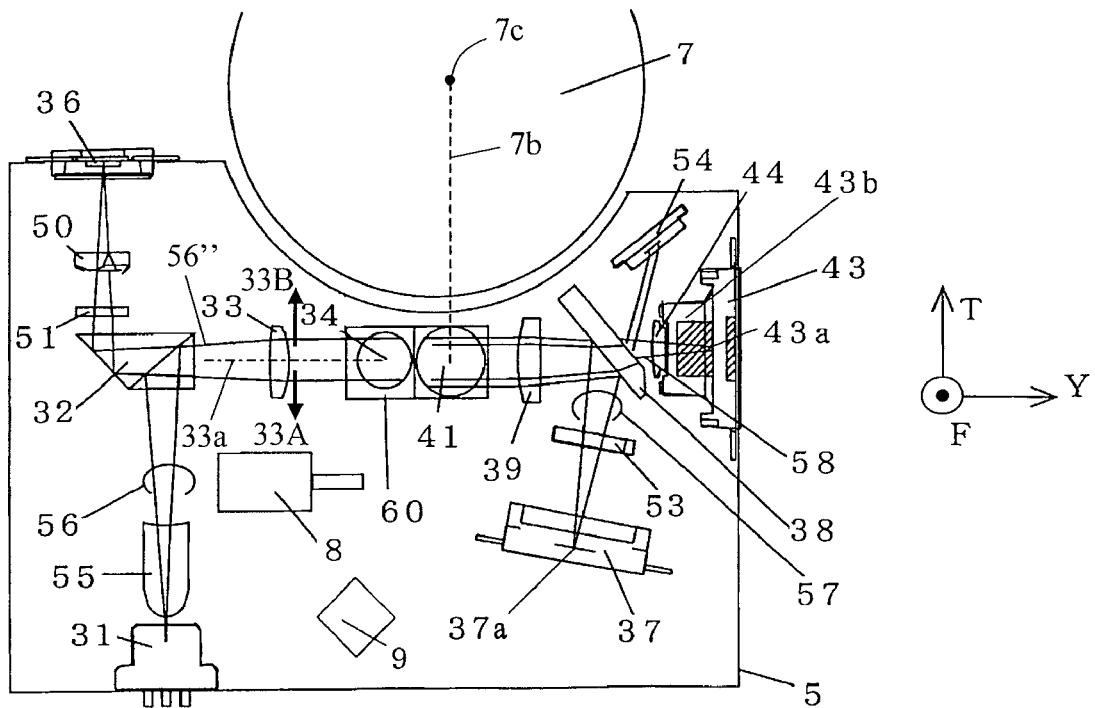
FIG. 3 is a plan view illustrating a preferred embodiment of the optical head.

FIG. 1 is a perspective view illustrating mainly the arrangement of an optical system in an optical head according to the present invention. FIG. 2 schematically illustrates some of the members shown in FIG. 1 as a combination of a plan view and a side view. And FIG. 3 is a plan view of the optical head shown in FIG. 1. In these drawings, the reference sign T denotes a tracking direction, F denotes a focusing direction, and Y denotes a direction perpendicular to the tracking direction. In other words, Y is the direction in which a series of pits or track grooves run.

In FIG. 2, the portion of the optical head between the two wave lines $W_1$ and $W_2$ is a side view, which is viewed on a plane parallel to the one defined by the directions F and Y. On the other hand, the other portions of the optical head outside of the two wave lines $W_1$ and $W_2$ are a plan view, which is viewed on a plane parallel to the one defined by the directions T and Y.

The optical head can perform read and/or write operation(s) on a first optical disk 320 with a high storage density such as a BD or an HD-DVD.

To perform read/write operation(s) on the first optical disk 35, the optical head includes a first light source 31, a beam splitter 32, a first collimator lens 33, a first mirror 60a and a first photodetector 36.

The first light source 31 may be implemented as a semiconductor laser and emit light with a first wavelength, e.g., a blue ray. The light 56 emitted from the first light source 31 is split by the beam splitter 32 into first and second light beams 56" and 56'. As will be described in detail later, the second light beam is detected by a photodetector 2 to control the intensity of the light emitted from the first light source 31.

The first light beam is incident on the first collimator lens 33 and has its degrees of divergence changed by the first collimator lens 33. Then, the first light beam that has had its degrees of divergence changed is incident on a slope 60a of the prism 60 functioning as the first mirror. The slope 60a changes the traveling directions of the first light beam. More specifically, the slope 60a changes the traveling directions of the first light beam, which has been traveling on a plane that is parallel to the first optical disk 35, by 90 degrees such that the light beam will go toward the first optical disk 35 and be incident on the first objective lens 34 as shown in FIGS. 1, 2 and 3.

The first objective lens 34 converges the first light beam on a storage layer of the first optical disk 35. The first light beam that has been reflected from the storage layer of the first optical disk 35 initially follows the same path in the opposite direction and then is reflected by the beam splitter 32 away from the first light source 31.

The first photodetector 36 receives the first light beam and converts it into electrical signals to generate an information signal and servo signals (such as a focus error signal for focus control and a tracking error signal for tracking control) by photoelectric conversion.

The optical head preferably can perform read/write operation(s) on not just the first optical disk 35 but also a second optical disk 320 with a different storage density. In this preferred embodiment, the second optical disk 320 may be a DVD, for example. For that purpose, the optical head includes an integrated unit 37, a second collimator lens 39 and a second objective lens 41.

The integrated unit 37 includes a second light source 37a that emits a light beam (e.g., a red ray) with a second wavelength that is longer than the first wavelength and a photodetector (not shown). The light 57 emitted from the second light source 37a is lead by a dichroic mirror 38 toward the second collimator lens 39, which changes the degrees of divergence of the light emitted from the second light source.

Then, the light 57 that has had its degrees of divergence changed is incident on another slope 60b of the prism 60. The slope 60b changes the traveling directions of the light 57. More specifically, the slope 60b changes the traveling directions of the light 57, which has been traveling on a plane that is parallel to the second optical disk 320, by 90 degrees such that the light 57 will go toward the second optical disk 320 and be incident on the second objective lens 41 as shown in FIGS. 1, 2 and 3.

The second objective lens 41 converges the light 57 on a storage layer of the second optical disk 320. The light 57 that has been reflected from the storage layer of the second optical disk 320 initially follows the same path in the opposite direction and then is diverted by some splitting means such as a polarization hologram 40 to a different direction to be incident on a photodetector 54. The photodetector 54 receives the reflected light and converts it into electrical signals to generate an information signal and servo signals (such as a focus error signal for focus control and a tracking error signal for tracking control) by photoelectric conversion. Optionally, the photodetector may be built in the integrated unit 37, including a light source and a photodetector. In that case, the optical head can have its overall size and thickness reduced and can achieve more stability.

The optical head preferably can perform read and/or write operation(s) on not just the first and second optical disks 35 and 320 but also on a third optical disk 46 with a different storage density. In this preferred embodiment, the third optical disk 46 may be a CD, for example. For that purpose, the optical head includes another integrated unit 43 and another photodetector 54.

The integrated unit 43 includes a third light source 43a that emits light with a third wavelength (e.g., an infrared ray) that is longer than the second wavelength. The light 58 emitted from the third light source 43a is transmitted through a dichroic mirror 38 and then incident on a second collimator lens 39. Optionally, a relay lens 44 may be arranged between the integrated unit 43 and the dichroic mirror 38. Then, the light 58 that has had its degrees of divergence changed by the second collimator lens 39 is incident on the slope 60b of the prism 60 and has its traveling directions changed. As a result, the light 58, which has been traveling on a plane that is parallel to the third optical disk 46, has its traveling directions changed by 90 degrees so as to go toward the third optical disk 46 and be incident on the second objective lens 41.

The light 58 that has been reflected from the storage layer of the third optical disk 46 initially follows the same path in the opposite direction and then is diverted by some splitting means such as a hologram 43b to a different direction to be incident on the photodetector in the integrated unit 43. The photodetector receives the reflected light and converts it into electrical signals to generate an information signal and servo signals (such as a focus error signal for focus control and a tracking error signal for tracking control) by photoelectric conversion. Optionally, the photodetector may be built in the integrated unit 37 along with the light source. In that case, the optical head can have its overall size and thickness reduced and can achieve more stability.

In this preferred embodiment, the vertical reflecting prism 60 has a triangular cross section and has the slopes 60a and 60b functioning as two mirrors. However, the two mirrors may be two independent members. Optionally, the vertex of the vertical reflecting prism 60 (or an edge line of the prism as a whole) may be chamfered to avoid chipping.

Also, in the preferred embodiment described above, the second and third light sources 37a and 43a are two different members, and therefore, the optical efficiency of the light beams emitted from these two light sources is increased by using the dichroic mirror 38. However, the second and third light sources 37a and 43a may be integrated together on the same semiconductor chip. In that case, the dichroic mirror 38 may be omitted.

The optical head of the present invention has various structural features to have a small overall size and to consistently exhibit good optical properties. Hereinafter, those features of the optical head of the present invention will be described one by one. In the following description, the first, second and third optical disks 35, 320 and 46 will sometimes be simply referred to herein as "optical disks". Likewise, the first and second objective lenses 34 and 41 will sometimes be simply referred to herein as "objective lenses".

First of all, it will be described what are the features of an optical system for high-density optical disks in the optical head of the present invention. Generally speaking, in performing a read/write operation on an optical disk with a high storage density such as a BD or an HD-DVD, a light source with a short wavelength needs to be used. In this preferred embodiment, the first light source 31 emits a blue ray and is used to read and write information from/on an optical disk with a high storage density. To write information with stability using the first light source 31, the emission intensity of the first light source 31 should be kept constant between an area with pits or marks (which will be referred to herein as "pit recorded portion") and an area with no pits or marks (which will be referred to herein as "non-recorded portion" or "erased portion").

For that purpose, the optical head of this preferred embodiment includes the photodetector 2 that measures the emission intensity of the first light source 31 as shown in FIG. 1. Also, to guide light to the photodetector 2, the beam splitter 32 splits the light 56 that has been emitted from the first light source 31 into the first light beam 56" traveling in the first direction and the second light beam 56' traveling in the second direction that is different from the first direction. As described above, the first light beam is incident on the collimator lens 33 and the second light beam 56' is incident on the photodetector 2.

The second light beam 56' has been diverged as well as the first light beam 56". That is why to obtain signal components that are sufficiently higher than electrical noise components, the photosensitive area of the photodetector 2 needs to be increased. Meanwhile, to obtain a signal in a high frequency range, the photosensitive area is preferably decreased and the electrical capacitance of the photosensitive area is preferably reduced. Thus, a tradeoff is inevitable between the increase in the signal-to-noise ratio (SNR) and the raise of the frequency range and it is difficult to achieve both of these two purposes at the same time.

Figure 4:
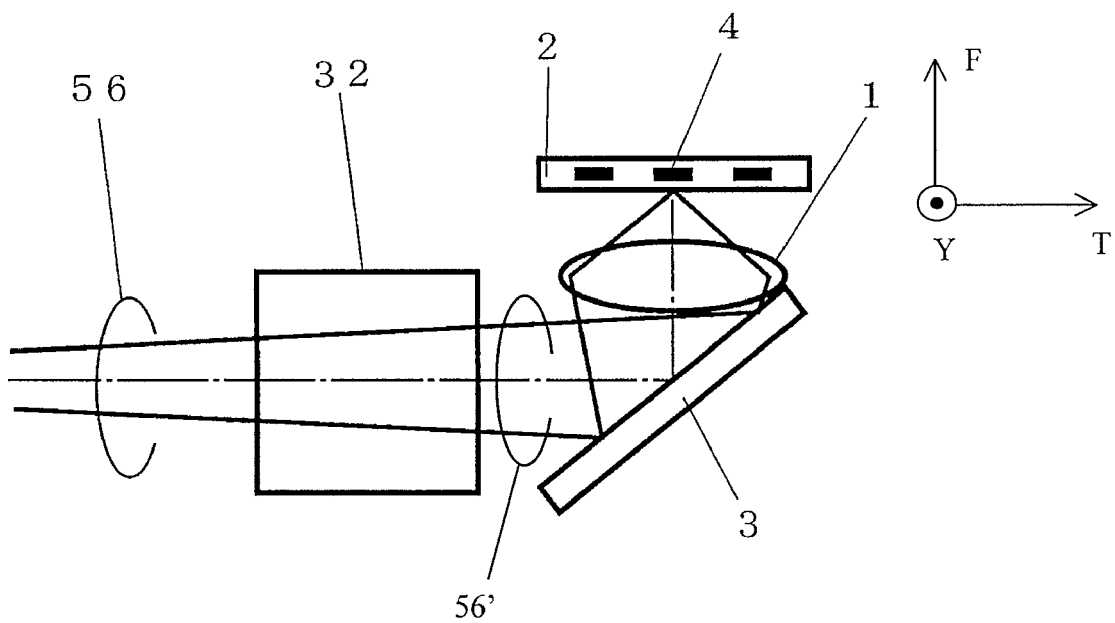
FIG. 4 is a side view illustrating an optical system for light that is going to enter a second photodetector.

To overcome this problem, the optical head of this preferred embodiment includes the condenser lens 1 for condensing the second light beam 56' that has been split by the beam splitter 32 as shown in FIGS. 1 and 4. The condenser lens 1 may transform the second light beam 56' diverged into a condensed one. In the arrangement shown in FIG. 4, the second light beam 56' is supposed to be focused on the photodetector 2. However, the second light beam 56' does not have to be focused there. Rather the second light beam 56' has only to have been condensed to a certain degree when leaving the beam splitter 32.

Thus, by providing the condenser lens 1, the light that is going to enter the photodetector 2 can be condensed such that a lot of light can be converged on a small photosensitive area of the photodetector. As a result, the intensity of the light emitted from the first light source 31 can be measured in a high frequency range and with a high SNR.

The optical head preferably further includes a mirror 3 (which corresponds to the second mirror) to change the traveling directions of the second light beam 56' that has come from the beam splitter 32. More specifically, the mirror 3 is arranged with respect to the beam splitter 32 such that the second light beam 56' that has come from the beam splitter 32 has its traveling directions changed by approximately 90 degrees. Therefore, if these members are arranged such that the light emitted from the first light source 31 travels in the direction T, the mirror 3 makes the optical axis of the second light beam 56' parallel to that of the first light beam 56" that has had its traveling directions changed by the slope 60a of the prism 60 as shown in FIGS. 1 and 4. Consequently, the photodetector 2 can be arranged in the direction F, not in the direction T, with respect to the optical path of the light 56 that has been emitted from the first light source 31. Thus, it is possible to prevent the members of the optical head from covering too much area in the direction T and is also possible to prevent the optical head moving toward the inner edge of the optical disk from colliding against the spindle motor that is rotating the optical disk.

In the preferred embodiment described above, the mirror 3 changes the traveling directions of the second light beam 56' such that the second light beam 56' goes toward the first objective lens 34. Alternatively, the mirror 3 may also change the traveling directions of the second light beam 56' such that the second light beam 56' goes away from the first objective lens 34.

Furthermore, if the photodetector 2 has a rectangular parallelepiped shape with a longitudinal direction, then the photodetector 2 is preferably arranged such that the longitudinal direction becomes substantially parallel to the optical axis of the first collimator lens 33 (i.e., parallel to the direction Y). Moreover, the electrical connector of the photodetector 2 is preferably located on one side that defines the longitudinal direction. Then, the members can be arranged in the optical head without allowing the photodetectors 36 and 2 to interfere with each other. In addition, it is also possible to prevent the members of the optical head from covering too much area in the direction T. Consequently, a read/write operation can be done with the optical head brought even closer to the inner edge of the optical disk.

Next, the first collimator lens 33 will be described. The first objective lens 34 for use to perform a read/write operation on an optical disk with a high storage density has a numerical aperture (NA) of 0.85 or more. With such a large numerical aperture, while a read/write operation is performed on the first optical disk 35, a significant spherical aberration produces due to a difference in the thickness of the transparent base member that covers the surface of the information storage layer of the first optical disk 35.

In this preferred embodiment, by moving the first collimator lens 33 along its optical axis, the degrees of divergence and convergence of the light going from the first collimator lens 33 toward the first objective lens 34 are changed. When the degree of divergence and convergence of the light entering the first objective lens 34 changes, the spherical aberration also changes. Thus, the spherical aberration caused by the difference in the thickness of the base member is corrected by utilizing this phenomenon.

For that purpose, the optical head includes a drive motor 8, which may be a combination of a motor such as a stepping motor and a brushless motor and any known mechanical element that transforms rotational driving force into translational driving force.

The holder to hold the first collimator lens 33 may be formed as an integral part of the collimator lens 33 in order to reduce the number of members required. The first collimator lens 33 transforms the incoming light so as to reduce the degree of parallelism (i.e., reduce the degree of divergence). The first collimator lens 33 may be a combination of concave and convex lenses. In that case, even if one of the concave and convex lenses is driven by the drive motor 8 parallel to the optical axis, the spherical aberration can also be corrected.

In this case, to allow the first objective lens 34 to reach the vicinity of the inner edge of the given optical disk (e.g., to a radius of approximately 20 mm), the optical head preferably protrudes from the first objective lens 34 toward the spindle motor 7 as little as possible. That is why as viewed on a plane that is parallel to the first optical disk 35, the drive motor 8 and the spindle motor 7 are preferably arranged on two opposite sides with respect to the optical axis 33a of the first collimator lens 33 as shown in FIG. 3. That is to say, as indicated by the arrow 33A, the drive motor 8 is preferably arranged closer to the outer edge of the first optical disk 35. As a result, the optical head can be moved to an inner area of the given optical disk without allowing the drive motor 8 for the first collimator lens 33 and the spindle motor 7 to interfere with each other.

As shown in FIGS. 1 to 3, the collimator lens 33 is preferably arranged as spherical aberration correcting means between the beam splitter 32 and the objective lens 34. As described above, by moving the collimator lens 33 along its optical axis with the driving force of the drive motor 8, the degree of divergence and convergence of the light that is going to enter the first objective lens 34 can be changed and the spherical aberration can be controlled.

Figure 13:
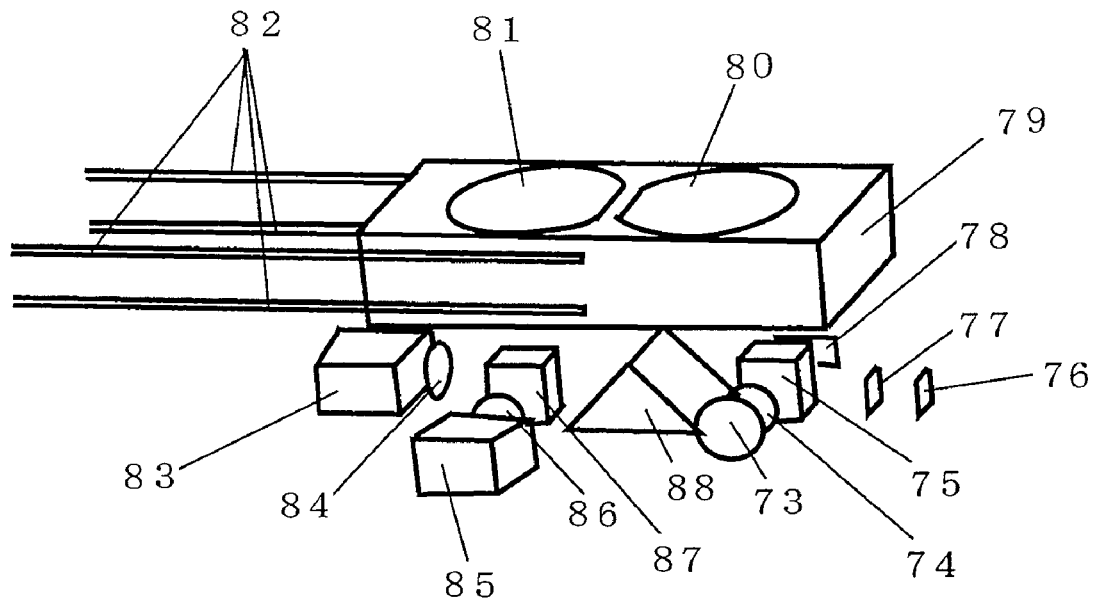
FIG. 13 is a perspective view illustrating the arrangement of another conventional optical head.

Patent Document No. 4 discloses that the collimator lens 74 is arranged between the light source 73 and the beam splitter 75 as shown in FIG. 13. In that case, even if the collimator lens 74 is moved to correct a spherical aberration, the light reflected from the optical disk and then incident on the photodetector 76 is not transmitted through the collimator lens 74. As a result, imaging is done differently between the path leading from the light source to the optical disk and the path leading from the optical disk to the photodetector. Consequently, the photodetector 76 cannot generate an accurate focus error signal.

In contrast, according to the present invention, the collimator lens is located between the light source and the optical disk and between the optical disk and the photodetector, and therefore, imaging can be done in the same way between these two paths. As a result, the spherical aberration can be corrected without changing the converging states of the light during the focus control. Consequently, the focus control and the spherical aberration correction can be done at the same time, which should be an overwhelming advantage of the present invention over the prior art.

Next, it will be described how to correct a chromatic aberration. If this optical head is introduced into an optical information processor that performs both read and write operations, the first light source 31 needs to emit light with higher optical power than the power for a read-only one. In that case, the light emitted from the first light source 31 may have its wavelength varied according to the output power. Thus, to correct a chromatic aberration that would be caused due to a variation in the wavelength of the light emitted from the first light source 31, the optical head further includes a chromatic aberration correcting lens 49. The lens 49 may be arranged between the first objective lens 34 and the prism 60, for example.

Figure 5:
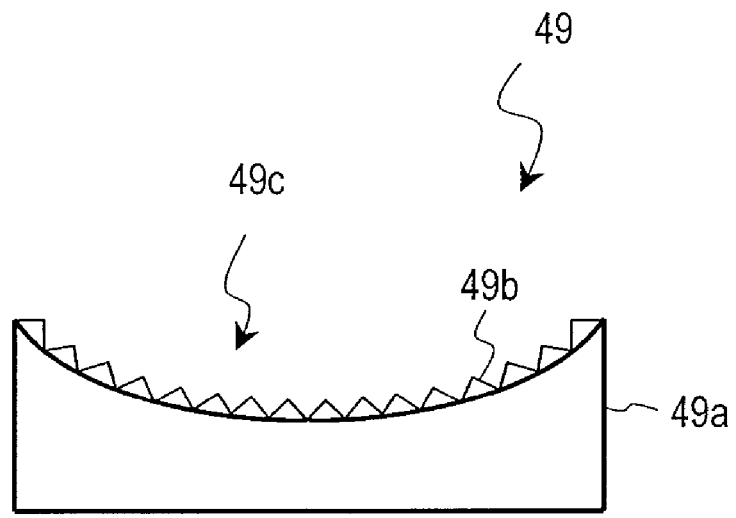
FIG. 5 is a side view illustrating the structure of a chromatic aberration correcting lens for use in the first preferred embodiment.

As shown in FIG. 5, the lens 49 may include a concave lens 49a and a diffraction lens 49b functioning as a convex lens. The diffraction lens 49b is preferably arranged on a curved surface 49c of the concave lens 49a. By arranging the diffraction lens 49b on the curved surface 49c with the same curvature as the concave lens' 49a, when zero-order diffracted light is reflected from the surface (i.e., when light that has not been subjected to the diffraction lens action is produced), no stray light will be reflected from a planar surface.

Optionally, the optical head may further include a lens 55 and a quarter-wave plate 48. The lens 55 is arranged near the first light source 31 and has a convex cylindrical portion facing the first light source 31 and a concave cylindrical portion on the opposite side. By arranging this lens 55, even in a situation where a far-field pattern does not have equal intensity distributions in two perpendicular directions on a plane that intersects with the optical axis of the outgoing light of the first light source 31 at right angles (i.e., even if the far-field pattern of the outgoing light beam is elliptical), such a far-field pattern can be transformed into a quasi-circular one, thus improving the optical efficiency of the light. On the other hand, the quarter-wave plate can increase the optical efficiency of the polarization beam splitter 59. Furthermore, if a diffraction element 51 and a lens 50 with a non-rotationally symmetrical shape are provided, the first photodetector 36 can generate servo signals that can be used effectively for control purposes.

Hereinafter, the arrangement of various members in the optical head will be described. First, it will be described where the first light source 31 and the first photodetector 36 should be arranged in the optical head. The first light source 31 requires a drive voltage of at least about 5 V. Compared to a drive voltage of approximately 3 V for conventional CD and DVD light sources, the first light source 31 should be driven with a higher voltage. That is why the first light source 31 would dissipate more power and would generate more heat. For that reason, the influence of such heat generation needs to be taken into consideration fully.

On the other hand, the first photodetector 36 receives the light that has been reflected from the first optical disk and converts it into an electrical signal. To amplify the signal and increase the SNR before electrical noise is superposed on the signal, the first photodetector 36 preferably further includes a signal-amplifying amplifier and the photodiode and that amplifier are preferably integrated together on the same chip. However, the amplifier will also generate heat when supplied with electricity. That is why if the first photodetector 36 were arranged near the first light source 31, the heat generated by the amplifier of the first photodetector 36 would raise the temperature of the first light source 31. In that case, the wavelength of the light emitted from the first light source 31 could shift or the first light source 31 might have a shorter life.

For that reason, as shown in FIGS. 1 and 3, the first photodetector 36 and the first light source 31 are preferably arranged on two opposite sides with respect to the optical axis of the first collimator lens 33 as viewed on a plane that is parallel to the first optical disk 35. In that case, the distance between the first photodetector 36 and the first light source 31 can be increased and the mutual influence of their heat can be reduced. As a result, an amplifier can be integrated with the first photodetector 36, a high SNR can be achieved, and the increase in the temperature of the first light source 31 can be minimized.

As shown in FIG. 3, the first photodetector 36 is preferably arranged closer to the inner edge of the optical disk (i.e., closer to the spindle motor) with respect to the optical axis of the first collimator lens 33 as indicated by the arrow 33B. As can be seen easily from FIG. 3, the spindle motor 7 is located near the first objective lens 34, and therefore, no members of the optical head are preferably arranged near the first objective lens 34 and closer to the inner edge of the optical disk with respect to the optical axis of the first collimator lens 33 as indicated by the arrow 33B. However, since the base 5 of the optical head has an arced recessed portion that can access the spindle motor 7 as shown in FIG. 3, a space for arranging the members of the optical head can be left outside of the recessed portion of the base 5 of the optical head. Consequently, by using that space outside of the recessed portion of the base 5, the first photodetector 36 and the first light source 31 can be arranged on two opposite sides with respect to the optical axis of the first collimator lens 33 without interfering with the spindle motor 7.

The optical head of this preferred embodiment has an object of reading and writing a huge amount of information from/on an optical disk. To process such a huge amount of information, information read and write rates also need to be increased. Particularly, in writing information, the write operation should be done quickly by changing the intensities of the outgoing light rapidly. That is to say, the current to be supplied to drive and energize the first light source 31 should be modulated quickly. For that purpose, a driver or a large-scale integrated circuit (LSI) that controls the amount of drive current for the first light source 31 is preferably arranged in the vicinity of the first light source 31. By arranging the driver near the first light source 31, the increase in resistance that would be caused by a long wire and the delay of signals due to such increased resistance can be avoided.

The driver that controls the drive current for the first light source 31 and a driver included in the integrated module 37 to control drive current for the second light source 37a share a lot of components. That is why if the same driver is used in common for the first and second light sources 31 and 37a and if the first and second light sources 31 and 37a are driven by the same driver implemented as an LSI, the overall size of the optical head can be reduced.

In view of these considerations, the optical head preferably further includes a driver 9 for driving the first and second light sources 31 and 37a and the driver 9 is preferably arranged near the first and second light sources 31 and 37a as shown in FIG. 3. To allow the optical head to go as close to the inner edge of the optical disk as possible and to get read/write operations done there, the first and second light sources 31 and 37a and the driver 9 are preferably arranged closer to the outer edge of the optical disk with respect to the optical axis 33a of the first collimator lens 33 as indicated by the arrow 33A. In that case, the emission of the first light source 31 can be modulated quickly and the overall size of the optical head can be reduced.

The optical head of this preferred embodiment includes two optical systems that use the first and second objective lenses 34 and 41, respectively. Hereinafter, the arrangement of these two optical systems will be described.

As shown in FIGS. 2 and 3, the respective optical axes of the light beams 56", 57 and 58 emitted from the first, second and third light sources 31, 37a and 43a and going to enter the prism 60 are preferably parallel to each other. Then, the slopes 60a and 60b of the prism 60 can be both defined in the direction coming out of the paper of FIG. 2 and the angles of incidence of the light beams on the first and second objective lenses 34 and 41 can be defined so as to be parallel to their optical axes. In addition, as the slopes 60a and 60b can be both defined perpendicularly to the paper, the vertical reflecting prism 60 can be made efficiently by cutting a long bar that is elongated perpendicularly to the paper. As a result, the manufacturing cost of the prism 60 can be cut down.

It should be noted that if these two slopes 60a and 60b of the prism 60 are used to vertically reflect the light beams emitted from the light sources, the optical axes cannot be controlled independently of each other by adjusting the angles of the two slopes 60a and 60b, unlike a situation where two mirrors are used. That is why a holder for adjusting the positions of the first, second and third light sources 31, 37a and 43a by sliding these light sources perpendicularly to their optical axes with respect to the base 5 (see FIG. 3) is preferably provided. By moving the first, second, and third light sources 31, 37a and 43a perpendicularly to their optical axes, the angles of the optical axes of the light that has passed through the first and second collimator lenses 33 and 39 are preferably adjusted.

As shown in FIGS. 1, 2 and 3, the first and second objective lenses 34 and 41 are fixed to the mover 45a of an objective lens actuator 45. The first and second objective lenses 34 and 41 are preferably arranged in the direction Y, i.e., substantially parallel to the direction in which the track grooves of the first optical disk 35 run. If the first and second objective lenses 34 and 41 were arranged in the direction T, which is perpendicular to the direction Y, then one of these two objective lenses in the idle state could collide against the spindle motor 7 (see FIGS. 1 and 2) or the housing of the apparatus when the optical head accesses the outermost or innermost area of the optical disk. However, by arranging the first and second objective lenses 34 and 41 in the direction Y, it is possible to prevent the optical head from colliding against the spindle motor or the housing and read/write operations can be done properly on any of multiple types of optical disks.

Also, the second objective lens 41 is preferably arranged on a line 7b, which passes approximately the center 7c of the optical disk and which runs in the direction in which the optical head moves to perform a seek operation, as shown in FIG. 3. By arranging the second objective lens 41 at such a location, a diffraction grating may be formed as a portion of the hologram 43b to produce a sub-beam and the tracking error signal can be generated by a three-beam method using the sub-beam. As a result, the signal can be detected with good stability particularly during a read operation using the third light source 43a. In that case, however, the first objective lens 35 will be located off the line 7b. That is why when a read/write operation is performed using the first light source 31, the tracking error signal is preferably generated by a single beam method without using the sub-beam.

Next, it will be described how to adjust the tilt angles of the first and second objective lenses 34 and 41 in the mover 45a.

According to Patent Document No. 3, two objective lenses can be made as a single lens assembly. In general, though, when an objective lens is being made, a coma aberration will be produced due to some manufacturing error to cause distortion in the converged beam. The degree of such distortion changes from one objective lens to another. That is why such a coma aberration is preferably reduced by tilting the two objective lens to their appropriate degrees.

As shown in FIG. 1, after the first objective lens 34 has been bonded to the mover 45a first, the tilt angle of the mover 45a is adjusted to reduce the aberration of the light that has been converged by the first objective lens 34. After that, the tilt angle of the second objective lens 41 is adjusted with respect to the mover 45a, thereby reducing the aberration of the light that has been converged by the second objective lens.

These adjustments can be made in the following manner. First of all, the tilt angle of the overall mover 45a is adjusted so as to minimize the coma aberration or make the converged beam spot as axisymmetric as possible when the light beam 56" is converged by the first objective lens 34. Next, in that state, the tilt angle of the second objective lens 41 is adjusted with respect to the mover 45a so as to minimize the coma aberration or to make the converged beam spot as axisymmetric as possible.

It is not impossible to fix the second objective lens 41 first with respect to the mover 45a and then adjust the tilt angle of the first objective lens 34 with respect to the mover 45a. However, this procedure would cause some inconvenience. Specifically, the greater the NA of a lens, the shorter the working distance (WD) between the surfaces of the lens and the optical disk tends to be. That is why in adjusting the tilt angle of the first objective lens 34 with respect to the mover 45a, a jig such as a pair of tweezers should be inserted through a narrow gap to change the tilt angles of the first objective lens 34, thus making it difficult to adjust the tilt angle.

In the optical head of this preferred embodiment, the shape of the second objective lens 41 is specially designed so as to adjust the tilt angle of the second objective lens 41 in the procedure described above.

Figure 6:
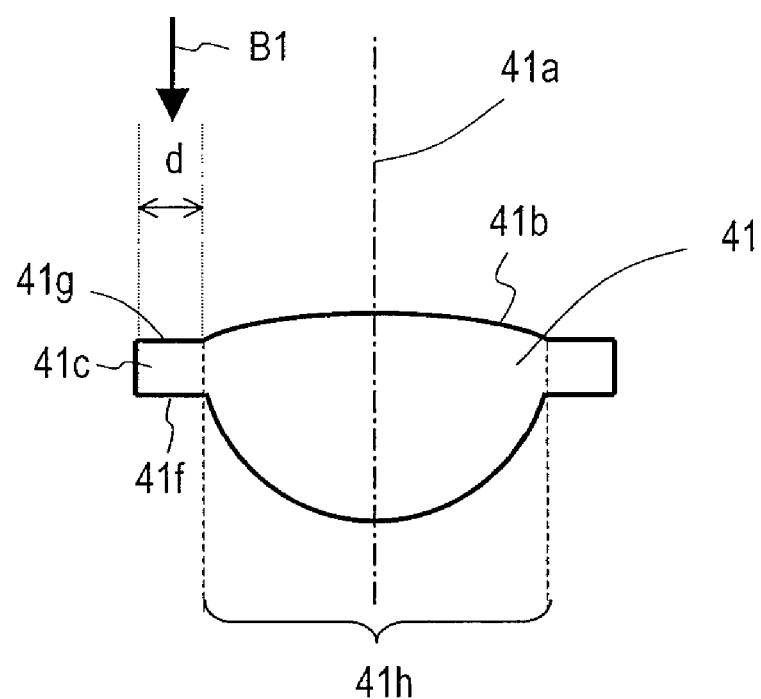
FIG. 6 is a cross-sectional view illustrating the structure of a second objective lens.

FIG. 6 schematically illustrates a cross-sectional shape of the second objective lens 41. The second objective lens 41 has a curved portion 41h to converge an incoming light beam and a flat portion 41c surrounding the curved portion 41h. The flat portion 41c is usually called a "flange" and will be referred to herein as such.

To change the tilt angles of the second objective lens 41, a jig such as a pair of tweezers needs to be inserted between the mover 45a and the objective lens. The jig such as tweezers should not bend while changing the tilt angles. The present inventors actually made such a jig and adjusted the tilt angle. As a result, we discovered that when the jig had a thickness of 0.5 mm or more, the jig never bent and the adjustments could be done easily. During the adjustments, if the surface of the lens that condenses the light beam were scratched, then the condensing performance of the lens would deteriorate. That is why the jig can contact with only the flange 41c. For that reason, the flange 41c preferably has a width d of 0.5 mm or more. The mover 45a has the two objective lenses but should have as light a weight as possible in order to move at high speeds. From this point of view, the objective lenses should also have small sizes and the flange 41c should not have an excessively big size, either. The optical disk sometimes needs to be turned up to about 10,000 rpm. To realize an objective lens actuator that satisfies the required servo performance even in such a situation, the flange 41c preferably has a width of 1 mm or less.

Also, after the tilt angle of the second objective lens 41 has been adjusted, the tilt angle of the objective lens is preferably measured. If the result of the measurement revealed that the tilt angle is excessive, then the lens could have poor performance. In that case, the lens could be defective and should not be used. As shown in FIG. 6, the tilt angle of the lens can be measured by irradiating the flange 41c of the second objective lens 41 with light B1 and monitoring the direction in which the light is reflected. To get the measurements done properly, appropriate reflected light should be produced. For that purpose, the upper surface 41g of the flange 41c is preferably flat. Also, to prevent the reflected light from being scattered, the upper surface 41g of the flange 41c is preferably mirror-polished. The present inventors discovered via experiments that if the upper surface had a width of at least 0.2 mm, no reflected light was scattered and the reflected light direction could be monitored accurately. In view of this consideration, the flange 41c preferably has a width d of 0.2 mm or more.

Normally, the outermost portion of the flange 41c is a curved portion with a width of approximately 0.1 mm. That is why the flat portion preferably has a width d of at least 0.3 mm (=0.2 mm+0.1 mm).

Furthermore, if the second objective lens 41 is fixed to the mover 45a, only the flange 41c can be brought into contact with the mover 45a to fix the second objective lens 41 to the mover 45a because a hole needs to provided to allow incoming light to enter the lens. The diameter of an objective lens ordinarily has an error of approximately ±10 μm, and the diameter of the hole of the mover 45a usually has an error of ±20 μm. Thus, these errors add up to ±30 μm, and therefore, the second objective lens 41 and the mover 45a may have a positioning error of at most 60 μm.

Even with a positioning error of 60 μm, the flange 41c preferably has a width of 60 μm or more to make contact with the mover 45a. Normally, the outermost portion of the flange 41c is a curved portion with a width of approximately 0.1 mm. From this point of view, the flange 41c preferably has a width d of at least 0.16 mm (=0.06 mm+0.1 mm).

Consequently, the flange 41c preferably has a width of 0.16 mm to 1 mm because the adjusted tilt angle of the objective lens can be measured and defective products can be screened out without fail. And the flange 41c more preferably has a width of 0.5 mm to 1 mm because the tilt angle can be easily adjusted in that case. By using the second objective lens 41 with a width falling within any of these ranges, the tilt angle of the objective lens can be adjusted easily and precisely by the method described above. As a result, high-performance optical heads can be manufactured with high productivity.

The optical head of this preferred embodiment has various structural features described above. Thus, the present invention provides an optical head that is compatible with multiple types of optical disks compliant with mutually different standards, has a small overall size, and can exhibit good optical properties consistently.

Embodiment 2

Figure 7:
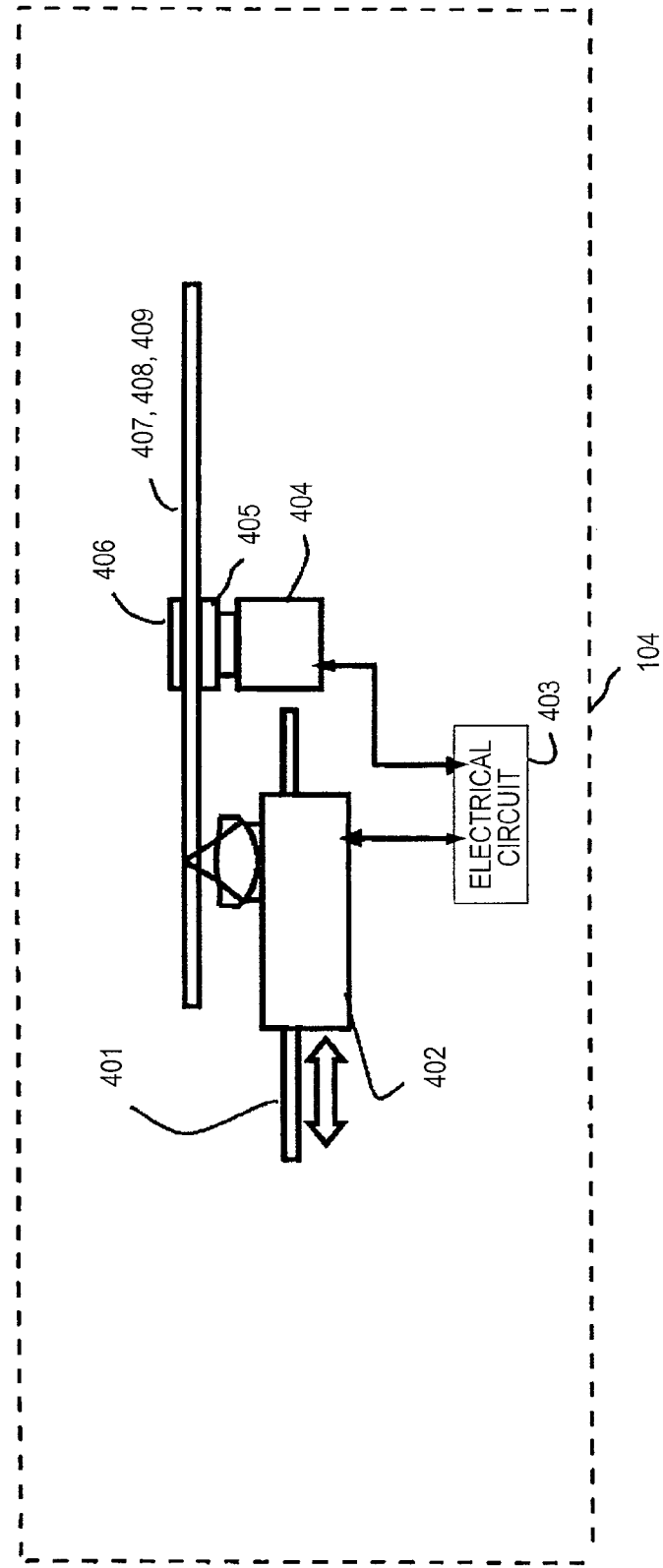
FIG. 7 illustrates the configuration of an optical information processor as a specific preferred embodiment of the present invention.

A preferred embodiment of an optical information processor according to the present invention will be described with reference to FIG. 7.

This optical information processor 104 includes an optical head 402, an electrical circuit 403, and a motor 404.

The optical disks 407, 408 and 409 have mutually different storage densities. One of these optical disks 407 to 409 is supposed to be picked by the operator and put on a turntable 405. The optical disk mounted is fixed by a clamper 406 onto the turntable 405 and then rotated and driven by the motor 404. The optical disks 407 to 409 correspond to the first, second and third optical disks 35, 320 and 46 of the first preferred embodiment described above.

The optical head of the first preferred embodiment described above can be used effectively as the optical head 402. The optical head can be moved in the tracking direction by a drive mechanism 401 such as a traverse motor and can jump to a target track.

Based on the positional relation with respect to the optical disk 407, 408 or 409, the optical head 402 outputs a focus error signal and a tracking error signal to the electrical circuit 403. In response to this signal, the electrical circuit 403 outputs a signal to the optical head 402 to move the objective lens. In accordance with this signal, the optical head 402 performs a focus control and a tracking control on the optical disk 407, 408 or 409 so that the optical information processor 104 can read and write information.

The optical information processor of this preferred embodiment includes the optical head of the first preferred embodiment described above. Thus, this optical information processor can perform a read/write operation on multiple types of optical disks with mutually different storage densities with good stability.

Embodiment 3

Figure 8:
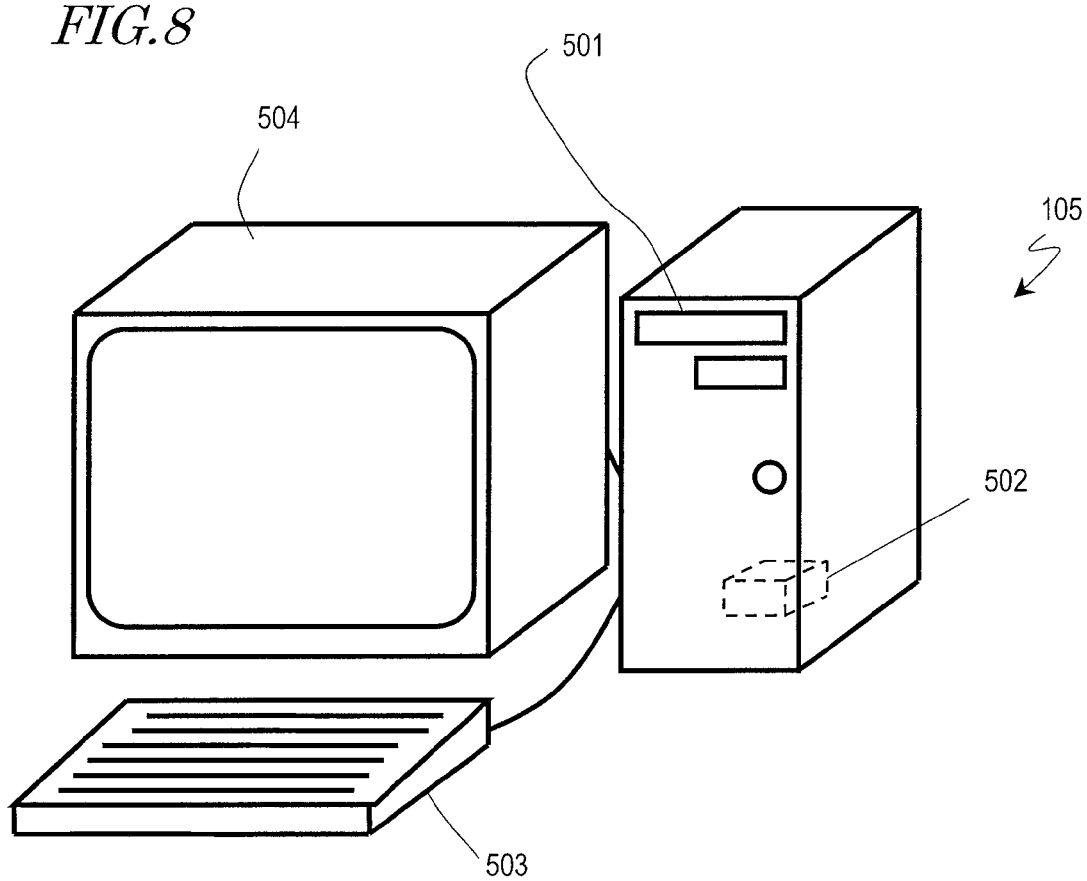
FIG. 8 illustrates the configuration of a computer as another specific preferred embodiment of the present invention.

A preferred embodiment of a computer according to the present invention will be described with reference to FIG. 8.

This computer 105 includes an optical information processor 501, which corresponds to the optical information processor 104 that has just been described as the second preferred embodiment of the present invention. The computer 105 further includes an input device 503 such as a keyboard, a mouse or a touchscreen panel for entering information and an arithmetic-logic unit 502 such as a central processing unit (CPU) for performing arithmetic and logic operations based on the information entered through the input device 503 or the information read by the optical information processor 501.

The computer 105 further includes an output device 504 such as a CRT, an LCD or a printer for displaying information such as the results of the computations done by the arithmetic-logic unit 502.

The computer 105 includes the optical information processor 501 that corresponds to the counterpart of the second preferred embodiment described above. Thus, this computer 105 can write video information, audio information or data on multiple types of optical disks compliant with mutually different standards, read any of these types of information from the optical disk, and process or edit the information according to the intended application.

Embodiment 4

Figure 9:
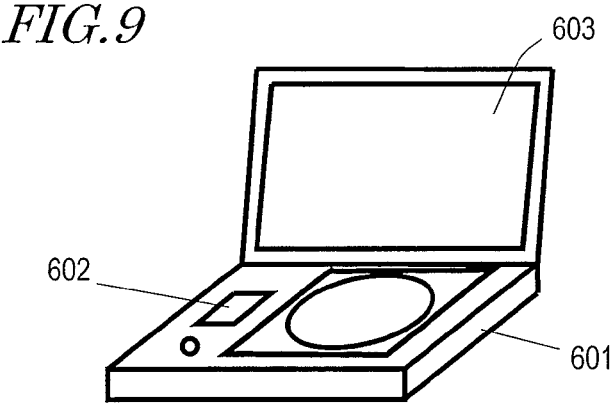
FIG. 9 illustrates the configuration of an optical disk player as another specific preferred embodiment of the present invention.

A preferred embodiment of an optical disk player according to the present invention will be described with reference to FIG. 9.

The optical disk player 106 includes an optical information processor 601, which corresponds to the optical information processor 104 as the second preferred embodiment described above. The optical disk player 106 further includes a converter 602 such as a decoder for converting the information signal supplied from the optical information processor 601 into an image. The optical disk player 106 may be used as a car navigation system, for example. The optical disk player 106 may further include a display device 603 such as an LCD monitor.

Embodiment 5

Figure 10:
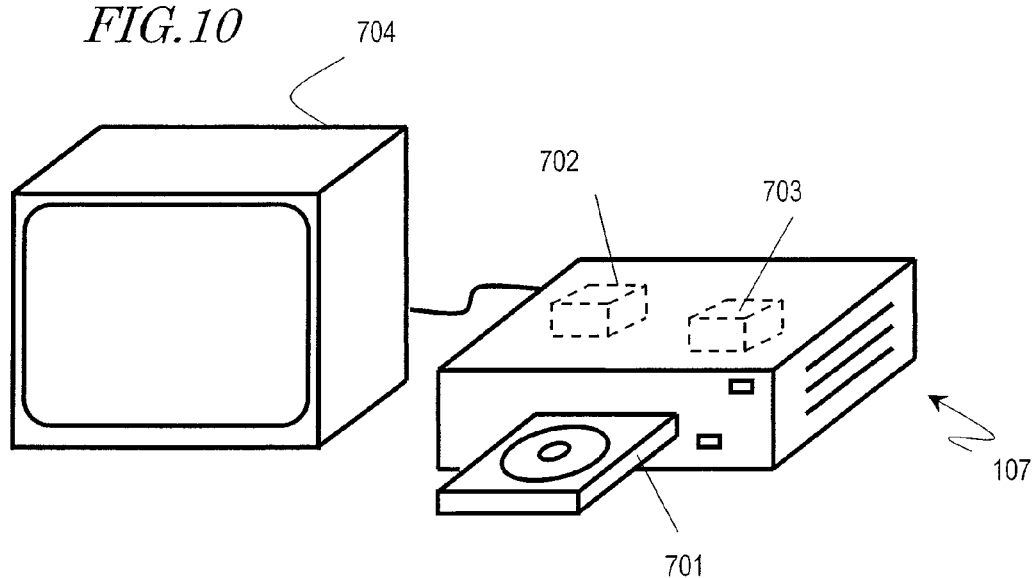
FIG. 10 illustrates the configuration of an optical disk recorder as another specific preferred embodiment of the present invention.

A preferred embodiment of an optical disk recorder according to the present invention will be described with reference to FIG. 10.

The optical disk recorder 107 includes an optical information processor 701, which corresponds to the optical information processor 104 as the second preferred embodiment described above. The optical disk recorder 107 further includes a converter 702 such as an encoder for converting image information into information to be written on an optical disk by the optical information processor 701. The optical disk recorder 107 may further include a decoder 703 for converting the information signal supplied from the optical information processor 701 into an image. The optical disk recorder 107 may further include an output device 704 such as a CRT, an LCD or a printer for displaying information.

Embodiment 6

Figure 11:
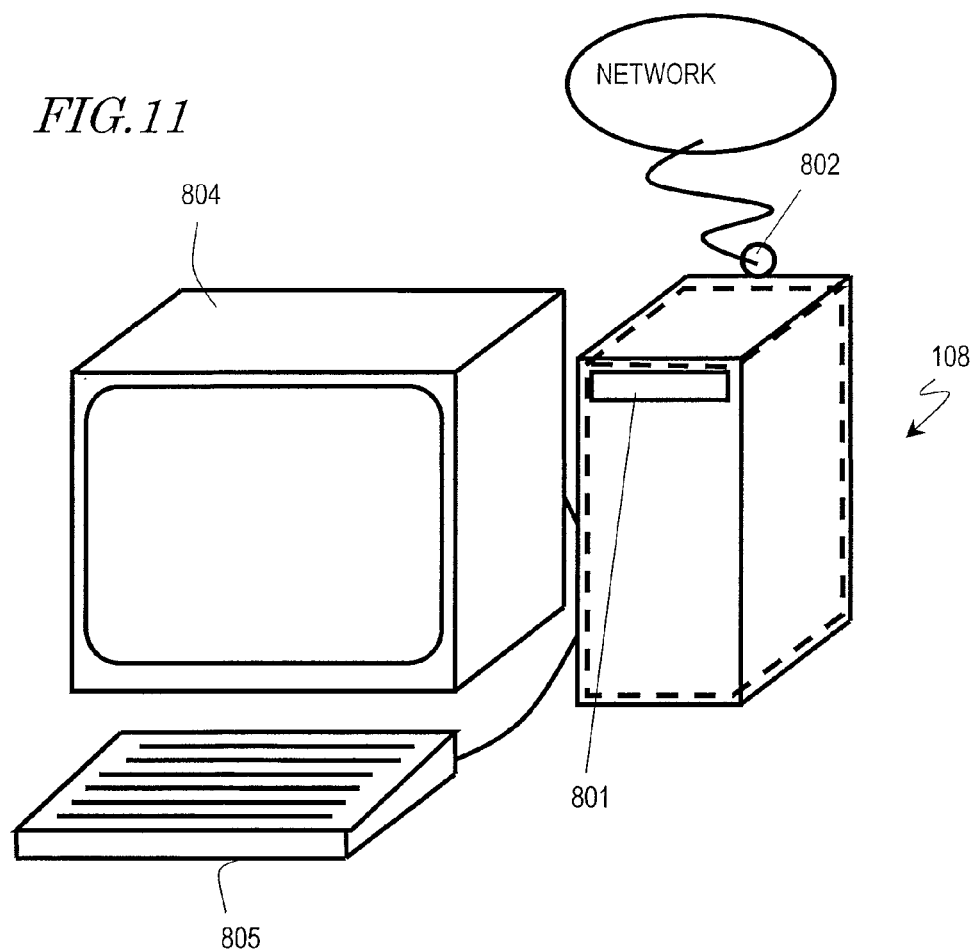
FIG. 11 illustrates the configuration of an optical disk server as another specific preferred embodiment of the present invention.
Figure 12:
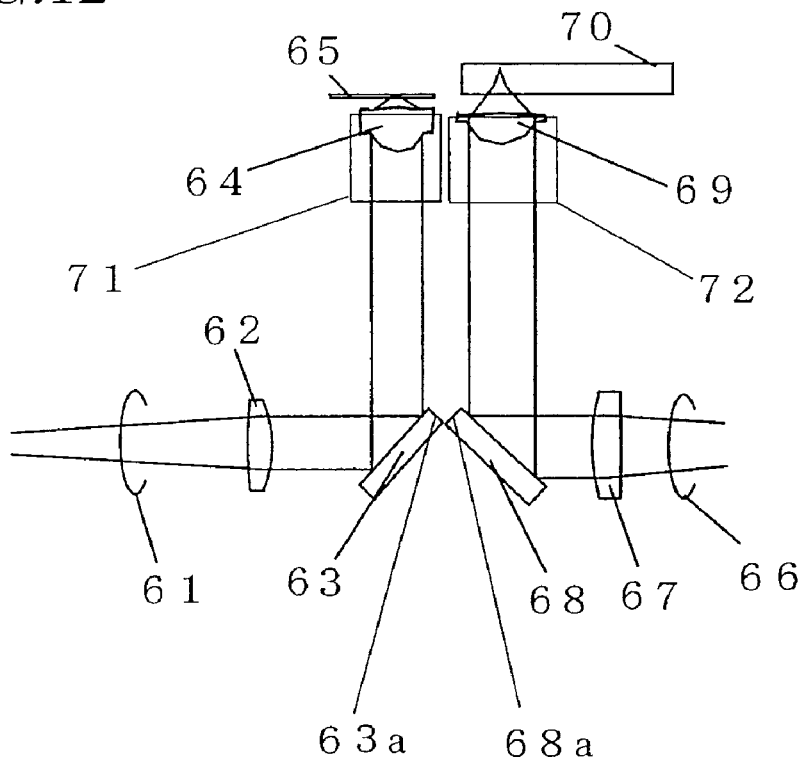
FIG. 12 is a side view illustrating the arrangement of a conventional optical head.

A preferred embodiment of an optical disk server according to the present invention will be described with reference to FIG. 11.

This optical disk server 108 includes an optical information processor 801, which corresponds to the optical information processor 104 that has been described as the second preferred embodiment of the present invention. The server 108 further includes an input device 805 such as a keyboard, a mouse or a touchscreen panel for entering information and a wired or wireless input/output terminal 802 for feeding information to be written by the optical information processor 801 or outputting information that has been read by the optical information processor 801. Using these members, the optical disk server 108 functions as a server that exchanges and shares information with multiple devices such as computers, telephones, and TV tuners over the network. The optical disk server 108 may further include an output device 804 such as a CRT, an LCD or a printer for displaying information. Optionally, by providing a changer (not shown) to load and unload multiple optical disks into/from the optical information processor 801, a lot of information can be written and stored.

The second through sixth preferred embodiments of the present invention described above include an output device and/or an input device. However, each of these preferred embodiments could include only input and/or output terminals with no output or input devices at all.

INDUSTRIAL APPLICABILITY

The present invention is effectively applicable for use in an optical head that performs read and/or write operation(s) on various types of optical disks with mutually different base material thicknesses, operating wavelengths, or storage densities and in an optical information processor such as an optical disk drive. Among other things, the present invention can be used particularly effectively in an optical information processor such as an optical disk drive with multiple objective lenses.

Consequently, the present invention is broadly applicable to any type of information storage systems including computers, optical disk players, optical disk recorders, car navigation systems, editing systems, data servers and AV components.

The invention claimed is:

1. An optical head unit comprising:
a first light source with a first wavelength;
a second light source with a second wavelength, the second wavelength being longer than the first wavelength;
a first collimator lens that changes the degrees of divergence of the light that has been emitted with the first wavelength from the first light source;
a first vertical reflecting mirror that changes the traveling directions of the light with the first wavelength that has had its degrees of divergence changed by the first collimator lens;
a first objective lens for converging the light with the first wavelength that has been vertically reflected by the first vertical reflecting mirror onto a storage layer of a first optical disk;
a mover that holds the first objective lens;
a first photodetector that receives the light with the first wavelength that has been converged by the first objective lens onto the storage layer of the optical disk and then reflected from the optical disk and that converts the light into an electrical signal;
a beam splitter that diverts the light with the first wavelength that has been emitted from the first light source away from the first collimator lens; and
a base that holds an optical member,
wherein the base has an arced recessed portion, and
wherein the first photodetector is arranged in a substantially straight continuous portion of the base that connects to an end of the arced recessed portion on the periphery of the base.

2. The optical head unit of claim 1, wherein the first photodetector and the first light source are arranged on two opposite sides with respect to the optical axis of the first collimator lens.

3. The optical head unit of claim 1, wherein the first light source and the second light source are arranged closer to the outer edge of the optical disk with respect to the optical axis of the first collimator lens.

4. The optical head unit of claim 3, wherein the first light source, the second light source, and a current circuit that energizes the first and second light sources are arranged close to each other.

5. The optical head unit of claim 1, further comprising a drive motor that moves the first collimator lens parallel to the optical axis thereof,
wherein the drive motor is arranged closer to the outer edge of the optical disk with respect to the optical axis of the first collimator lens.

6. An objective lens for use as a second objective lens in an optical head unit that includes:
a light source with a first wavelength;
a light source with a second wavelength that is longer than the first wavelength;
a first objective lens that converges light with the first wavelength on a storage layer of a first optical disk;
the second objective lens that converges light with the second wavelength on a storage layer of a second optical disk;
a mover that holds the first and second objective lenses; and
a photodetector that receives light and converts the light into an electrical signal,
wherein the objective lens has a flange with a width of 0.16 mm to 1 mm,
wherein the surface of the flange is mirror-finished.

7. The objective lens of claim 6, wherein the flange has a width of 0.5 mm to 1 mm.

8. An optical information system comprising:
the optical head unit of claim 1;
a motor that rotates the optical disk; and
an electrical circuit for controlling and driving the motor, an optical lens and a laser light source responsive to a signal supplied from the optical head unit.

9. An optical head unit comprising:
a light source with a first wavelength;
a light source with a second wavelength that is longer than the first wavelength;
a first objective lens that converges light with the first wavelength on a storage layer of a first optical disk;
the objective lens of claim 6 that converges light with the second wavelength on a storage layer of a second optical disk;
a mover that holds the first objective lens and the objective lens of claim 6; and
a photodetector that receives light and converts the light into an electrical signal.

10. An optical information system comprising:
the optical head unit of claim 9;
a motor that rotates the optical disk; and
an electrical circuit for controlling and driving the motor, an optical lens and a laser light source responsive to a signal supplied from the optical head unit.

* * * * *